[19] United States Patent
Sherwood
[11] 3,751,686
[45] Aug. 7, 1973

[54] TELEGRAPH RELAY

[75] Inventor: John R. Sherwood, Arlington, Va.
[73] Assignee: AMF Incorporated, White Plains, N.Y.

[22] Filed: Dec. 1, 1971
[21] Appl. No.: 203,582

[52] U.S. Cl. .................. 307/241, 178/70 T, 178/88, 307/235, 328/152
[51] Int. Cl. .................. H03k 17/00
[58] Field of Search .................. 307/235, 241–243, 307/262; 178/70 T, 88; 328/152

[56] References Cited

UNITED STATES PATENTS

| | | | |
|---|---|---|---|
| 2,999,170 | 9/1961 | Tyler | 307/228 |
| 3,148,286 | 9/1964 | Pickering et al. | 307/242 X |
| 3,372,234 | 3/1968 | Bowsher et al. | 307/243 X |

*Primary Examiner*—John Zazworsky
*Attorney*—George W. Price and Charles J. Worth

[57] ABSTRACT

A solid state telegraph relay of the dual channel type is provided in which each signal channel output is constrained to OPEN and CLOSE as a function of the differential between the strengths of the respective input signals thereto. Each channel includes a Darlington output switch controlled by the output of a switching oscillator, the latter being controlled by a Schmitt trigger circuit which in turn is controlled by a bias oscillator cross coupled with the opposite channel and providing an output, to the trigger circuit, as a linear function of the signal strength in said opposite channel, in opposition to an input signal derived from the signal channel associated with said trigger circuit as a function of its input signal strength. Accordingly, when both input signals are equal the outputs of both signal channels are OPEN and when one of said input signals is greater than the other by a predetermined percentage differential, the output of that one of said signal channels will be constrained to CLOSE. Application of a variable bias to the input of one of said signal channels serves to selectively vary the Mark/Space time at the output of the other. Thus, the telegraph relay provided can function in both the differential mode and the bias mode.

12 Claims, 2 Drawing Figures

FIG. I

Figure 1:
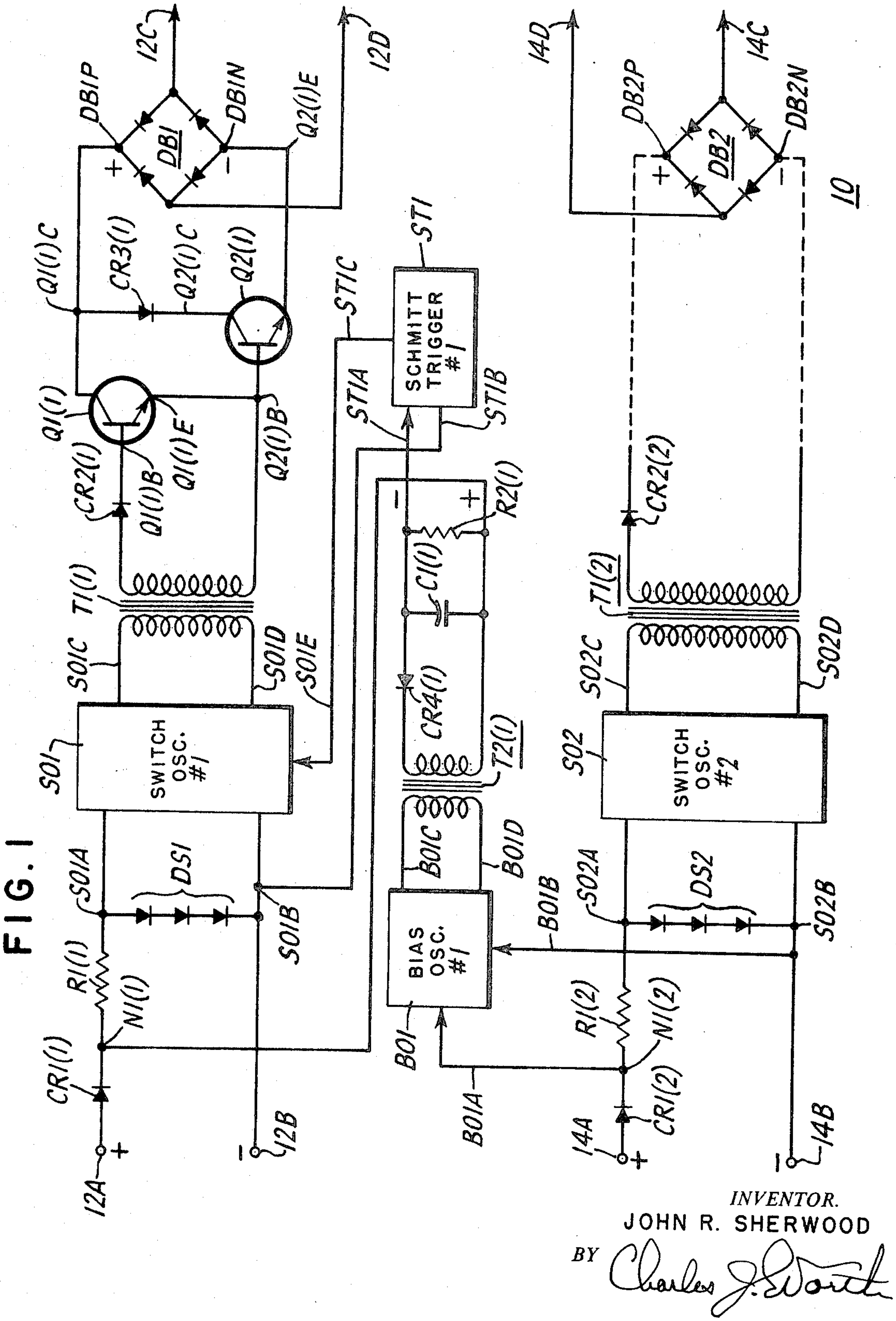

INVENTOR.
JOHN R. SHERWOOD
BY Charles J. Worth
AGENT

INVENTOR
JOHN R. SHERWOOD
BY Charles J. Worth
AGENT

TELEGRAPH RELAY

This invention relates to telegraph relays and more particularly to a telegraph relay of the dual channel type which selectively actuates its outputs by way of comparison of the relative signal strengths at its inputs.

In teletype transmissions and other telegraph type service, differential dual channel telegraph relays are used to provide neutral to polar action and normal form "A" operation as well as to compensate for bias distortion, i.e., unequal Mark/Space time in the bias mode operation.

In providing a solid state relay to satisfy these functions, the circuit must be rugged; compact; withstand high voltages in the OFF condition and high currents in the ON condition; response must operate and hold its differential over a wide range of input currents and a wide temperature range; and provide a high degree of isolation, such as on the order of 500 volts (AC) between input to input, input to output, or either input to either output or either input or output to the case containing the relay module. Further, the relay must be symmetrical, such that either input can be used as the bias input for bias mode operation; must operate as a form "A" telegraph relay when only one of its two inputs is driven; and must operate as a polar input device when both inputs are driven from a polar signal.

It is, therefore, an object of the present invention to provide a new and novel solid state telegraph relay.

It is another object of the present invention to provide a new and novel solid state telegraph relay of the dual channel differential type which is capable of operating in the bias mode, differential mode and/or normal form "A" telegraphs signal mode without modification.

Another object of the present invention is to provide a new and novel solid state telegraph relay of the dual channel differential type having symmetrical signal channels such that either input thereof can be utilized as the bias input in the bias mode of operation.

And another object of the present invention is to provide a new and novel solid state telegraph relay of the dual channel differential type which will operate as a form "A" telegraph relay when only one of its two inputs is driven.

Still another object of the present invention is to provide a new and novel solid state telegraph relay of the dual channel differential type which will operate as a polar input device when both inputs are driven from a polar signal.

Still another object of the present invention is to provide a solid state telgraph relay which is highly sensitive in that it is capable of operating from the normal loop current of a telegraph circuit and does not require an external source of power.

Still another object of the present invention is to provide a new and novel solid state telegraph relay of the dual channel differential type which is rugged, compact and capable of withstanding high voltages in the OFF condition and high currents in the ON condition.

And still another object of the present invention is to provide a new and novel solid state telegraph relay of the dual channel differential type which provides stable and reliable operation over a wide range of input currents and ambient temperatures.

Yet another object of the present invention is to provide a new and novel solid state telegraph relay of the dual channel differential type which provides a a high degree of isolation between input to input, input and output in each channel, between either input to either output, and between either input or output to the case housing the said relay as a modular unit.

The foregoing and other objects and advantages of the invention will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

Figure 2:
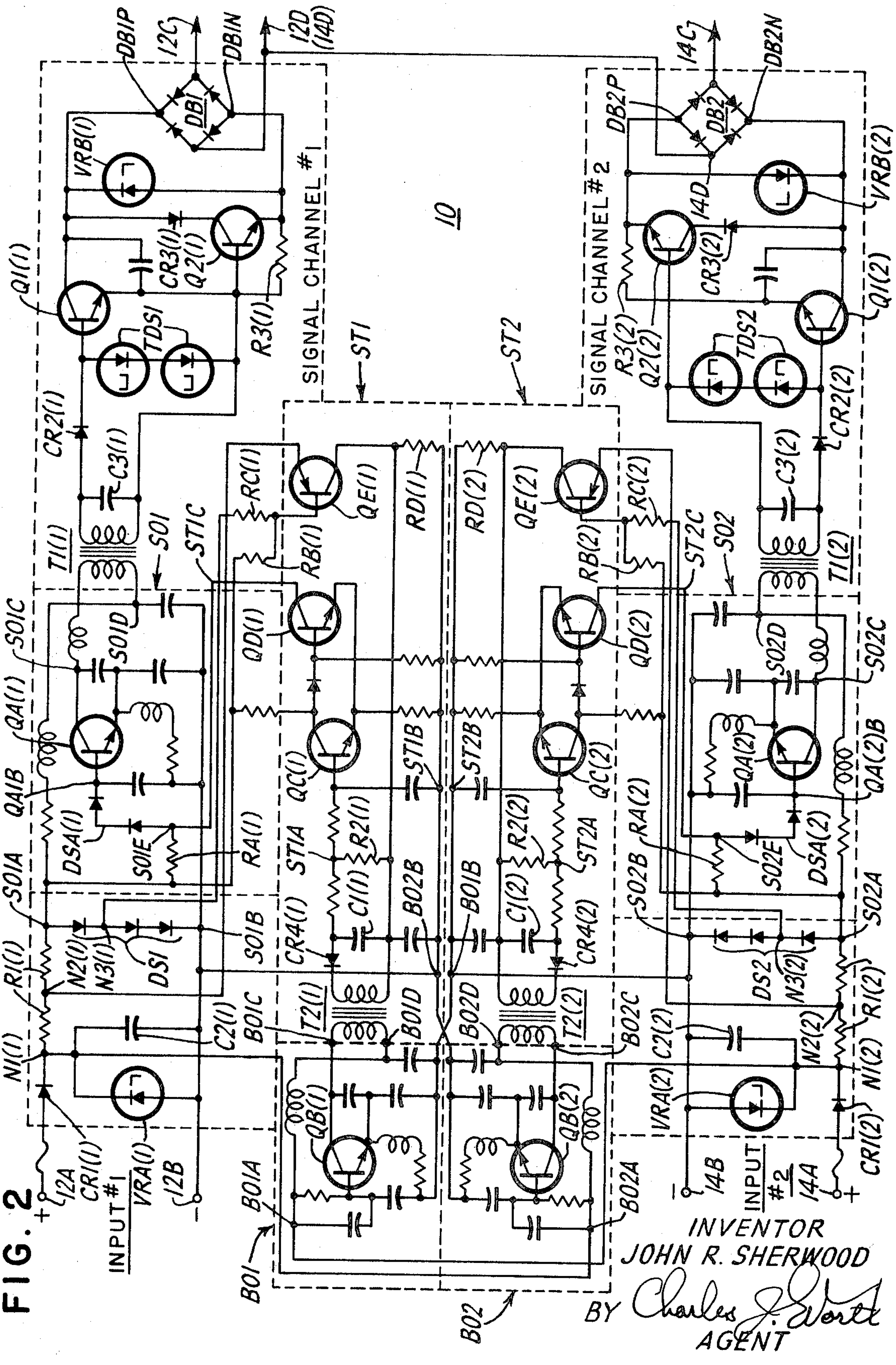

FIG. 1 is a partial block diagram of the relay of the present invention illustrating the differential interaction between the channels thereof; and FIG. 2 is a schematic circuit diagram of a preferred embodiment of the relay of the present invention.

Referring in detail to the drawings, and with specific reference to FIG. 1, the telegraph relay 10 of the present invention is shown as comprising first and second input terminal pairs 12A - 12B and 14A - 14B, respectively, the suffix A designating the positive terminal and the suffix B the negative terminal in each pair.

These first and second input terminal pairs 12A - 12B and 14A - 14B, correspond to first and second output terminal pairs 12C - 12D and 14C - 14D, respectively, with the output terminals 12D and 14D comprising a common output terminal for the said first and second output terminal pairs.

The first positive input terminal 12A is connected through a polarity determining diode CR1(1), circuit node N1(1) and input resistance R1(1) to a first input terminal SO1A of a first switching oscillator SO1, the latter having a second input terminal SO1B connected in common with the first negative input terminal 12B.

A string of diodes DS1 is connected across the input terminals SO1A and SO1B of the first switching oscillator SO1 to function as a low voltage Zener diode and provide a regulated input voltage to the said first switching oscillator SO1 when a sufficient signal amplitude or magnitude of the proper polarity is received across the first input terminal pair 12A - 12B.

The output terminals SO1C and SO1D of the first switching oscillator SO1 drive the primary winding of a first coupling transformer T1(1), the latter having a secondary winding connected at one end through a polarity determining second diode CR2(1) to the base terminal Q1(1) B of a first transistor Q1(1) and its other end connected directly to the base terminal Q2(1)B of a second transistor Q2(1), connected in a Darlington configuration with the first transistor Q1(1).

The collector Q1(1)C of the first transistor Q1(1) is connected directly to the positive terminal of DB1P of a first diode bridge DB1, the latter having negative terminal DB1N connected to the emitter terminal Q2(1)E of the second transistor Q2(1) in the Darlington configuration.

The collector terminal Q1(1)C of the first transistor Q1(1) and the positive terminal DB1P of the diode bridge DB1 are connected through the anode-cathode path of a third diode CR3(1) to the collector terminal Q2(1)C of the second transistor Q2(1).

The first output terminal pair 12C and 12D consists of the opposite diagonal terminals of the diode bridge DB1 from the diagonally disposed positive and negative bridge terminals DB1P and DB1N.

The first switching oscillator SO1 is controlled in its operation (ON-OFF) by a first Schmitt trigger circuit ST1, the latter having a first input terminal ST1A, a second input terminal ST1B connected in common with the second input terminal SO1B of the switching oscillator SO1, and an output terminal ST1C connected directly with a control input terminal SO1E in the switching oscillator SO1.

The first Schmitt trigger input ST1A is connected through a polarity determining fourth diode CR4(1) to one side of a secondary winding of a second coupling transformer T2(1), the other side of said secondary winding comprising a common connection with the first circuit node N1(1) between the first polarity determining diode CR1(1) and the input resistance R1(1) at the input terminal 12A of the first input terminal pair 12A – 12B.

The cathode of the fourth diode CR4(1) is connected directly at the secondary winding of the second coupling transformer T2(1), while at the anode thereof there is connected one side of a filter network comprised of a capacitance C1(1) and a resistance R2(1) in parallel, the other side of said network being directly connected to the other side of the said secondary winding.

This results in the voltage coupled from the primary to the secondary of the said second coupling transformer being applied to the input terminals ST1A and ST1B of the first Schmitt trigger ST1 in opposition to the signal voltage applied thereto from the first input terminal pair 12A – 12B of the telegraph relay circuit 10.

Therefore, the first Schmitt trigger circuit ST1 is selectively energized as a function of a differential between a bias signal voltage and an input signal voltage applied to the first input terminal pair 12A - 12B.

The bias signal voltage is supplied to the first Schmitt trigger circuit ST1 from a first bias oscillator BO1 having the characteristic that its output voltage amplitude is directly proportional to its input signal voltage, the latter being supplied to input terminals BO1A and BO1B. The first terminal BO1A is connected to the first circuit node N1(2) adjacent the first input terminal 14A of the second input terminal pair 14A – 14B. The second input terminal BO1B of the first bias oscillator BO1A is directly connected to the second input terminal 14B of the said second input terminal pair 14A – 14B.

The output terminals BO1C and BO1D of the first bias oscillator BO1 are directly connected at respectively opposite ends of the primary winding of the second coupling transformer T2(1) to complete the circuit connections for the first signal channel of the telegraph relay 10.

The second signal channel, fed by the second input terminal pair 14A – 14B is a mirror image of the first channel (fed by the first input terminal pair 12A – 12B,) wherein identical numerals modified by the suffix 2 are utilized to designate like elements.

While only partially shown in FIG. 1, the second channel is shown in full detail in FIG. 2 and includes a second bias oscillator BO2 and a second Schmitt trigger circuit ST2 cross-coupled with the first and second channels in a corresponding manner to the first bias oscillator BO1 and first Schmitt trigger circuit ST1 of the first signal channel.

Before preceeding with a detailed description of the full schematic of FIG. 2, the operation of the circuit of FIG. 1 will now be described.

Assuming, first, a form "A" type of operation wherein an input signal is applied to the input terminal pair 12A – 12B in order to obtain an output signal at the output terminal pair 12C – 12D in the same signal channel, the magnitude of the input signal across the input terminal pair 12A – 12B must be sufficient to turn on the switching oscillator SO1.

Once the first switching oscillator SO1 commences to oscillate, its output will be sufficient to drive, through the first coupling transformer T1(1), the first of the two Darlington connected transistors Q1(1) into conduction. As is well known, because of the Darlington connection, the second transistor Q2(1) is then driven into conduction and "CLOSE" the output terminals 12C – 12D in response to an input signal of predetermined magnitude.

In the form "A" operation of only a signal channel of the telegraph relay 10, the Schmitt trigger circuit ST1 and the first bias oscillator circuit BO1 are assumed to be disconnected or disable for purposes of this description.

The diode bridge DB1 across the first output terminals 12C – 12D permits these output terminals to be non-polarity sensitive but insures that only a positive voltage is applied to the collector terminals Q1(1)C and Q2(1)C of the respective first and second transistors Q1(1) and Q2(1) comprising the Darlington switch controlling the opening and closing of these output terminals.

In a preferred embodiment of the invention, the switching oscillator SO1 operates at approximately 1.5 MHz so that its output can be coupled into the Darlington switch configuration through the transformer T1, which because of the high frequency of operation of the switching oscillator SO1 is physically small and also has very little capacitive coupling between the primary and secondary windings (on the order of less than 1 pico-farad).

The characteristics of the first coupling transformer T1(1) thus provides a high degree of AC as well as DC isolation between the input terminal pair 12A–12B and the output terminal pair 12C–12D.

The second diode CR2(1) rectifies the radio frequency signal generated by the first switching oscillator SO1 to thereby obtain the necessary current to drive the first switching transistor Q1(1) in the Darlington configuration. The first and second transistors are in a modified Darlington configuration to the extent that the third diode CR3(1) has been placed in the circuit so that the second transistor Q2(1) can be driven into saturation and thereby keep its dissipation at an acceptably low level.

In further explanation of the diode string DS1 across the input terminals SO1A and SO1B of the first switching oscillator SO1, this diode string acts as the equivalent of a low voltage Zener diode. The action of the diode string DS1 thus regulates the supply to the switching oscillator SO1 and accordingly keeps the output power at the terminals SO1C and SO1D thereof at a level that will insure the saturation of the second transistor Q2(1) in the Darlington switch but not at so high a level that the radiated and conducted radio frequency interference level will become intolerable.

When the telegraph relay 10 is connected for differential operation (bias mode) the first Schmitt trigger circuit ST1 controls the turn on of the first switching oscillator SO1. The Schmitt trigger circuit ST1, across its input terminals ST1A and ST1B, is driven by an input that consists of the algebraic sum of two voltages, namely, the (positive) voltage drop between the circuit node N1(1) and the input terminal SO1B of the first switching oscillator SO1 (across the resistor R1 and the diode string DS1) opposed by the (negative) voltage drop consisting of the rectified output of the first bias oscillator BO1 across the resistance - capacitance network R2(1) and C1(1) across the secondary winding of the second coupling transistor T2(1).

This voltage output level of the first bias oscillator BO1 depends on the IR drop across the input resistance R1(2) and the second diode string DS2 in the second signal channel, i.e., across the second input terminal pair 14A–14B. Either the signal strength across the second input terminal pair 14A–14B or the presence of a fixed bias or variable bias local battery across these terminals may be utilized to effect either the differential mode of operation of the telegraph relay 10 or a bias mode of operation when the batteries are utilized.

Therefore, the input to the first Schmitt trigger circuit ST1 is the sum of two voltages that are functions of the two signal input currents at the first and second input terminal pairs 12A–12B and 14A–14B, respectively.

In this regard, it is the function and purpose of the second coupling transformer T2(1) to provide a very high degree of both AC and DC isolation between the said two input terminal pairs.

The first Schmitt trigger circuit ST1 is so designed that its output is turned OFF and correspondingly, the first switching oscillator SO1 will not be turned ON until the current at the first input terminal pair 12A–12B exceeds that across the second input terminal pair 14A–14B by a small predetermined percentage. When the Schmitt trigger circuits ST1 and ST2 are turned ON, the resulting output voltages at the terminals ST1C and ST2C, respectively, bias the first and second switching oscillators SO1 and SO2 ON and cause their respectively associated output terminal pairs to be closed via the Darlington switches.

There is a similar bias oscillator and a Schmitt trigger for the second switching oscillator SO2 which is shown in FIG. 2 and will be hereinafter more fully described. At this point in the description of the invention, however, it is sufficient to say that the first and second signal channels, the latter only being partially shown in FIG. 1, are symmetrical and that both the Schmitt trigger circuits are set so that when the inputs thereto to the input terminal pairs are equal, both output terminal pairs 12C–12D and 14C–14D are turned off. Alternatively, when one input current at the input terminal pairs 12A–12B and 14A–14B is a small percentage higher than the other of said input current, the corresponding output to the higher input current will be "closed" via the corresponding Darlington switching circuit in that signal channel.

Because of the circuit configuration of the present invention the comparison of input currents is on a relative or percentage basis and both inputs can vary over a wide range (typically, for example, 5 - 80MA) and neither output will come ON so long as the inputs are equal.

Both the bias oscillators BO1 and BO2 and the switching oscillators SO1 and SO2 are basically of the Colpitts type.

The Schmitt trigger circuits are also of a basically conventional type and in the embodiment of FIG. 2, as will be hereinafter more fully described, include an inverter at the output thereof to cut off the positive voltage to the input of each of the Schmitt trigger circuits ST1 and ST2 when the input current to either is below a given level. Conversely, the inverter circuit is so designed that until the positive input level is high enough, the Schmitt trigger circuits ST1 and ST2 will not trip so that the voltage output from the Schmitt trigger ST1 and ST2 will be insufficient to to drive the switching oscillating circuits SO1.

With the inverter circuit included in each of the Schmitt trigger circuits ST1 and ST2 the switching oscillators SO1 and/or SO2 can be made to stop oscillating abruptly when the input current to the input terminal pairs 12A–12B and/or 14A–14B is reduced rather than continue to oscillate at a very low level. This is because it is desirable that the switching oscillators SO1 and SO2 either drive the second transistor in the Darlington switch Q2(1) and Q2(2) into saturation or stop completely. If either of these second transistors are only part way on, the dissipation therein will be excessive.

Accordingly, the inverter configuration in the Schmitt trigger circuits ST1 and ST2 is utilized to permit lower input current operation of the telegraph relay 10.

Referring now to FIG. 2, the broken lines therein define the various bias and switching oscillator and Schmitt trigger circuits previously described in FIG. 1 and designated by like numerals in FIG. 2.

Except in those instances where specific circuit elements have been added to perform specific functions in the telegraph relay 10, the basic circuit configurations of the bias oscillators BO1 and BO2, the switching oscillators SO1 and SO2, and the Schmitt trigger circuits ST1 and ST2 will be only generally described as comprising conventional circuitry.

The switching oscillator SO1 includes as its active element a transistor QA(1) which is connected in a Colpitts circuit configuration to drive the primary of the first coupling transformer T1(1).

The first bias oscillator BO1 includes as its active element, a transistor QB(1) which is connected in a Colpitts circuit configuration to drive the primary of the second coupling transformer T2(1).

As a protective device to preclude an excessive voltage input from damaging the switching oscillator, there is placed, across the first and second pairs of input terminals 12A–12B and 14A–14B, respectively, first Zener diodes VRA(1) and VRA(2), extending, respectively, from the circuit node N1(1) to the terminal at 12B and from the first circuit node N1(2) to the input terminal 14B, the cathode of each of said Zener diodes being connected to the said first circuit node in each channel. Correspondingly, second Zener diode VR3(1) and VRB(2) are connected across the outputs of the Darlington switches, i.e., across the positive and negative terminals of the diode bridges DB1 and DB2, to preclude damage to the outputs of the signal channels as shown in FIG. 2. The cathodes of the second voltage regulating Zener diodes VRB(1) and VRB(2) are connected to the positive terminals DB1P and DB2P, respectively, of the diode bridges DB1 and DB2.

The input protective first Zener diodes VRA(1) and VRA(2) have a respective transient supressing capacitance as C2(1) and C2(2) connected in parallel thereacross.

The secondary of the first coupling transformers T1(1) and T1(2), respectively, have connected thereacross capacitances C3(1) and C3(2) which cause the secondaries of these transformers to resonate to thereby increase the voltage input from the switching oscillators SO1 and SO2 and reduce the high frequency interference, which may be present, to an acceptable level. Also, in these networks, connected across the base terminals of the first and second transistors Q1(1)-Q2(1) and Q1(2)-Q2(2), respectively, are connected tunnel diode strings TDS1 and TDS2, respectively, which preclude excessive peak voltages from being applied to the Darlington switch and damaging the first and second transistors which comprise it. The Darlington switches further include resistors R3(1) and R3(2), respectively, connected across the base and emitters terminals of the second transistors Q2(1) and Q2(2), respectively. These resistors on the output transistors and the tunnel diodes on the first Darlington transistors provide for a low DC return from base to emitter on the second transistors (output switching transistors) in the Darlington switches to permit the use of a low voltage rated transistor as that circuit element.

Going back to the input side of each channel, the input resistance R1(1) and R2(2) are split by means of respective center taps N2(1) and N2(2) or the like so that the supply voltage applied to the bias oscillators BO1 and BO2 can be somewhat greater than the positive voltages that are fed directly into the input terminals ST1A and ST2A of the Schmitt trigger circuits ST1 and ST2, respectively.

The switching oscillator circuits SO1 and SO2 comprise, respectively, single transistors QA(1) and QA(2) connected in a Colpitts configuration as the active element therein, the respective bases QA(1)B and QA(2)B thereof being connected through diode strings DSA(1) and DSA(2) to the third input terminals SO1E and SO2E of the said oscillators. These input terminals are directly connected, respectively, to the output terminals ST1C and ST2C of the first and second Schmitt trigger circuits ST1 and ST2. The diode strings DSA(1) and DSA(2) have their forward conducting direction into the said base terminals QA(1)B and QA(2) B from the said third input terminals SO1E and SO2E, respectively.

The third input terminals SO1E and SO2E are connected, respectively, to the first input terminals SO1A and SO2A of the switching oscillators SO1 and SO2 through resistance RA(1) and RA(2). The said first input terminals SO1A and SO2A are also respectively connected through resistances RB(1) and RB(2) to the base terminals of transistors QE(1) and QE(2) which comprise the aforementioned inverter circuits in the first and second Schmitt trigger circuits ST1 and ST2. These same base terminals of the transistors QE(1) and QE(2) are connected, respectively, through resistance RC(1) and RC(2) to intermediate nodes N3(1) and N3(2) in the first and second diode strings DS1 and DS2, respectively, while their associated emitter terminals are directly connected to the center taps or nodes N2(1) and N2(2) of the input resistances R1(1) and R1(2), respectively. The collector terminals of the inverter transistors QE(1) and QE(2) are respectively connected through inverter load resistances RD(1) and RD(2) to the common connection of the first and second negative input terminals 12B and 14B with the input terminals BO2B and BO1B of the second and first bias oscillators BO1 and BO2.

The collector terminals of the inverter transistors QE(1) and QE(2) are also respectively connected with the positive end of the input resistances R2(1) and R2(2) of the first and second Schmitt trigger circuits ST1 and ST2.

The said inverter transistors are now able to control the application of switching voltages to the Schmitt trigger inputs as well as the effects of the voltage drop across the base input resistances RA(1) and RA(2) at the third inputs SO1E and SO2E, respectively, of the switching oscillators SO1 and SO2.

The first and second Schmitt trigger circuits ST1 and ST2 include as their active elements input transistors QC(1) and QC(2) and output transistors QD(1) and QD(2), respectively, connected in a substantially conventional Schmitt trigger configuration.

The collectors of the output transistors QD(1) and QD(2), respectively, comprise the output terminals ST1C and ST2C of the Schmitt trigger circuits ST1 and ST2 and are directly connected with the output terminals SO1E and SO2E of the said Schmitt trigger circuits.

Thus, upon triggering of the Schmitt trigger circuits ST1 or ST2 to the ON state by the respective bias oscillators BO1 and BO2, the output voltage from the said Schmitt trigger circuits is applied to the bases of the transistors QA(1) or QA(2) in the switching oscillators SO1 and SO2 through the respective diode strings DSA(1) and DSA(2).

This output voltage is provided at such a level as to turn the associated one of said switching oscillators SO1 and SO2 to a full ON state, to thereby drive its associated Darlington switches Q1(1)-Q2(1) and Q1(2)-Q2(2) into saturation, via the coupling transformers T1(1) and T1(2) and CLOSE the respectively associated one of the output terminal pairs 12C-12D and 14C-14D.

As an example of the operation of the telegraph relay 10, referring to FIG. 2, assume that a signal voltage is applied across the first input terminal pair 12A-12B that is of a greater magnitude than that applied across the second input terminal pair 14A-14B in an amount exceeding the differential to which the relay 10 will properly respond.

The bias oscillators BO1 and BO2 become energized by these input signals and their respective output signal strengths vary linearly in direct proportion to the input signals on the second and and first input terminal pairs 14A-14B and 12A-12B respectively.

As a result, the opposing voltages effected across the Schmitt trigger input resistances R2(1) and R2(2) are directly proportional to the input signals from the respectively opposite channel and are in opposition to the signals in their respective channels. Thus, since the input at the first input terminal pair 12A-12B is the larger, the net input to the first Schmitt trigger circuit ST1 will be positive and that circuit will turn ON i.e., the input transistor QC(1) will turn ON, the output transistor QD(1) will turn OFF and the resulting increase in voltage at the collector thereof (output terminal ST1C) will correspondingly appear at the base of the transistor QA(1), in the first switching oscillator SO1, via the input terminal SO1E and diode string DSA(1), to thereby energize the said switching oscillator SO1 and activate the first Darlington switch Q1(1)–Q2(1), causing the first output terminal pair 12C–12D to CLOSE by way of the output transistor Q2(1) being driven into saturation.

If the two input signals to the input terminal pairs 12A–12B and 14A–14B are equal, there will be insufficient input voltage to trigger either of the Schmitt trigger circuits ST1 and ST2 and the output transistors QE(1) and QE(2) thereof will remain in the ON state, dropping the base terminals (input terminals SO1E and SO2E) below the voltage needed to trigger the switching oscillators SO1 and SO2 to an ON state.

Accordingly, both output terminal pairs 12C–12D and 14C–14D will remain OPEN, the output transistors Q2(1) and Q2(2) being turned OFF.

Should the relative magnitudes of the signal at the second input terminals 14A–14B be greater than that at the first input terminals 12A–12B, then, in a manner like that previously described, the second bias oscillator BO2, second Schmitt trigger ST2, second switching oscillator SO2, and second Darlington switch Q1(2)–Q2(2) will cause saturation of the output transistor Q2(2) and thereby CLOSE the second output terminal pair 14C–14D.

Therefore, whether in the differential or in the bias mode of operation, the signal channel having the greatest input signal magnitude will have its output terminals closed and if both input signals are equal, both output terminals will remain OPEN.

The inverter transistors QE(1) and QE(2) serve as a means to preclude the application of a positive net input voltage to the Schmitt trigger circuits ST1 and ST2, since the outputs thereof across the load resistance RD(1) and RD(2) also controls the positive net input potential to the Schmitt trigger circuits ST1 and ST2.

Now, since the inverters QE(1) and QE(2) have their base-emitter inputs derived from the drop between circuit nodes N2(1)–N3(1) and N2(2)–N3(2), which inputs are proportional to the input signal current levels to the channels of the relay 10, the said inverters are responsive to turn ON and preclude the application of a net positive input to the said Schmitt trigger circuits when the input currents to the relay 10 fall below a given level. This level, of course, is selectively adjustable by way of the circuit parameters used in assembling the relay 10.

Accordingly, by controlling the capability of the Schmitt trigger circuits ST1 and ST2 to respond to input signals, the switching oscillators SO1 and SO2 and their respective signal channels can also be selectively disabled as a function of input signal strengths to the relay 10.

As can now be readily understood, the present invention provides a versatile solid state telegraph relay of a new and novel configuration in keeping with the stated objects of the present invention.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A telegraph relay having first and second signal channels for receiving first and second input signals, respectively;

said signal channels including, respectively, input means, switching oscillator means connected across said input means, output means, solid state output switch means across said output means for controlling the OPEN and CLOSE states of said output means, and coupling means between said switching oscillator means and said output switch means, the latter being controlled by the former;

trigger circuit means for each said signal channel controlling the ON and OFF states of said switching oscillator means; and bias oscillator means for each said signal channel controlling the ON and OFF states of said switching oscillator means;

said bias oscillator means for each said channel controlling said trigger circuit means as a function of the input signal strength at the input means of the other of said signal channels such that in said channel receiving the largest of said input signals, the associated one of said trigger circuit means and said switching oscillator means will be energized and cause the associated said output switching means constrain the associated said output means to a CLOSE state; and such that input signals of less than a predetermined difference in magnitude will result in both said output means being constrained to an OPEN state.

2. The invention defined in claim 1, wherein said trigger circuit means includes control means connected to the associated one of said input means to sense a predetermined parameter of said input signal in the respectively associated one of said signal channels and preclude energization of said trigger circuit means when said predetermined parameter is outside a predetermined limit, to thereby preclude a change of state in said output means in response to such input signal.

3. The invention defined in claim 1, wherein said relay further includes second coupling means at the output of each said bias oscillator means; and trigger circuit input means energized by said bias oscillator through said second coupling means;

said trigger circuit input means including impedance means interconnected with said second coupling means, respectively, associated one of said signal channel input means and the associated one of said trigger circuit means such that the output of said bias oscillator means is applied to said trigger circuit means in opposition to said input signal applied to said associated one of said signal channel input means;

the resulting input to said trigger circuit means being a fuction of the differential between said input signal in said first and second signal channels.

4. The invention defined in claim 3, wherein said trigger circuit means includes control means connected to the associated one of said input means to sense a predetermined parameter of said input signal in the respectively associated one of said signal channels and preclude energization of said trigger circuit means when said predetermined parameter is outside a predetermined limit, to thereby preclude a change of state in said output means in response to such input signal.

5. The invention defined in claim 1, wherein said output of each said bias oscillator means varies as a function of input signal strength in the opposite one of said signal channels.

6. The invention defined in claim 3, wherein said output of each said bias oscillator means varies as a function of input signal strength in the opposite one of said signal channels.

7. The invention defined in claim 1, wherein said trigger circuit means includes control means connected to the associated one of said input means to sense a predetermined parameter of said input signal in the respectively associated one of said signal channels and preclude energization of said trigger circuit means when said predetermined parameter is outside a predetermined limit, to thereby preclude a change of state in said output means in response to such input signal; said output of each said bias oscillator means varies linearly as a function of input signal strength in opposite ones of said signal channels.

8. The invention defined in claim 3, wherein said trigger circuit means includes control means connected to the associated one of said input means to sense a predetermined parameter of said input signal in the respectively associated one of said signal channels and preclude energization of said trigger circuit means when said predetermined parameter is outside a predetermined limit, to thereby preclude a change of state in said output means in response to such input signal; and said output of each said bias oscillator means varies as a function of the input signal strength in the opposite one of said signal channels.

9. The invention defined in claim 1, wherein one of said signal inputs comprises variable bias means selectively varying the ratio of bias current in one said signal channel to input current in the other said signal channel to selectively vary the Mark/Space time ratio at the output means of said other signal channel.

10. The invention defined in claim 1, wherein said switching oscillator means include means abruptly constraining said switching oscillator means to the OFF state in response to a predetermined parameter of said input signals when said parameter is outside a preselected limit.

11. A telegraph relay having a first signal channel for receiving a first input signal, said signal channel including input means, switching oscillator means connected to said input means, output means, solid state output switch means for controlling the OPEN and CLOSE states of said output means, and coupling means between said switching oscillator means and said output switch means, the latter being controlled by the former, trigger circuit means for said signal channel controlling the ON and OFF states of said switching oscillator means, bias oscillator means for producing an output signal whose magnitude is variable, means coupled to receive said first input signal and the output signal of said bias oscillator for producing a signal to actuate said trigger circuit means only when said first input signal exceeds said output signal of said bias oscillator by a predetermined magnitude, said trigger cicuit means producing a trigger signal when actuated which controls said switching oscillator means to constrain said output means to a CLOSE state.

12. The telegraph relay defined in claim 11 and including, a second signal channel for receiving second input signals coupled as an input to said bias oscillator, said bias oscillator responding to said second input signals and producing an output whose magnitue is a function of said second input signal.

* * * * *